Figure 1:
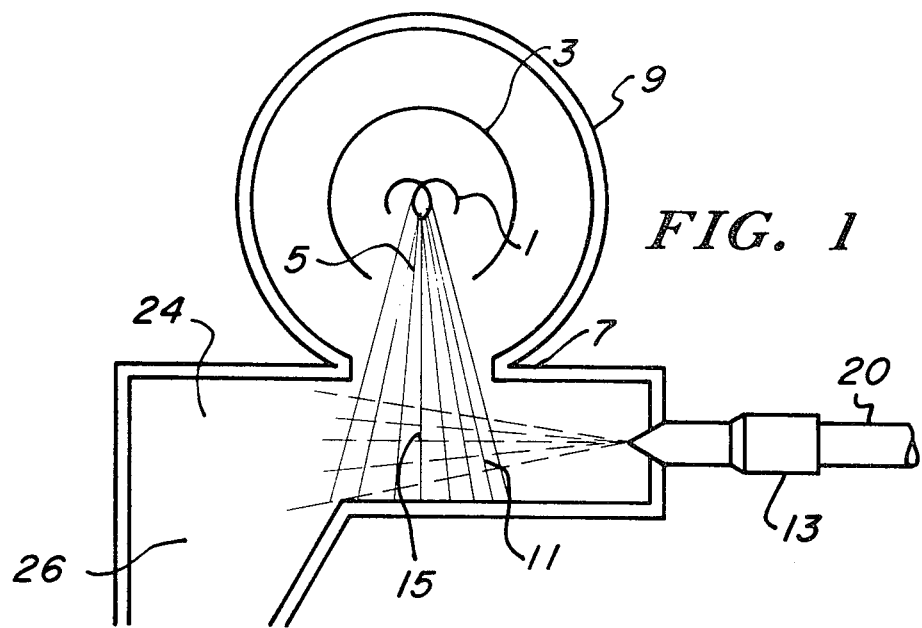

United States Patent [19]

Singelyn

[11] 4,273,831

[45] Jun. 16, 1981

[54] POWDERED POLYMER COMPOSITIONS PRODUCED BY ELECTRON BEAM POLYMERIZATION OF POLYMERIZABLE COMPOSITIONS

[75] Inventor: James D. Singelyn, Middletown, Conn.

[73] Assignee: Kemtec, Inc., Middletown, Conn.

[21] Appl. No.: 58,926

[22] Filed: Jul. 23, 1979

Related U.S. Application Data

[63] Continuation-in-part of Ser. No. 938,891, Sep. 1, 1978, Pat. No. 4,172,776, which is a continuation-in-part of Ser. No. 699,864, Jun. 25, 1976, abandoned.

[51] Int. Cl.$^3$ .................................................. B32B 5/16
[52] U.S. Cl. .............................. 428/402; 204/159.22; 250/531
[58] Field of Search ..................... 428/402; 204/159.22

[56] References Cited

U.S. PATENT DOCUMENTS

| | | | |
|---|---|---|---|
| 2,666,025 | 1/1954 | Nozaki | 204/158 |
| 2,892,946 | 6/1959 | Dewey et al. | 250/49.5 |
| 2,900,277 | 8/1959 | Schmitz | 427/44 |
| 2,914,495 | 11/1959 | Gordon et al. | 260/29.6 ME |
| 2,921,006 | 1/1960 | Schmitz | 204/154 |
| 3,013,957 | 12/1961 | Waddington | 204/154 |
| 3,048,530 | 8/1962 | Minhara et al. | 204/158 |
| 3,132,966 | 5/1964 | Hughes et al. | 427/42 |
| 3,142,665 | 7/1964 | Cardinal et al. | 428/402 |
| 3,228,865 | 1/1966 | Vogh | 204/163 |
| 3,247,012 | 4/1966 | Burlant | 427/44 |
| 3,271,180 | 9/1966 | White | 204/157.1 R |
| 3,414,499 | 12/1968 | Gardner et al. | 204/159.22 |
| 3,440,084 | 4/1969 | Turner | 427/42 |
| 3,522,226 | 7/1970 | Wright | 526/294 |
| 3,560,447 | 2/1971 | Bingham | 428/402 |
| 3,576,789 | 4/1971 | Kochhar et al. | 428/402 |
| 3,612,941 | 10/1971 | Noble et al. | 313/310 |
| 3,635,750 | 1/1972 | Wright | 204/159.22 |
| 3,640,984 | 2/1972 | Miller | 428/402 |
| 3,644,305 | 2/1972 | Frisque et al. | 526/229 |
| 3,702,412 | 11/1972 | Quintal | 313/299 |
| 3,734,764 | 5/1973 | Miller | 204/159.18 |
| 3,745,396 | 7/1973 | Quintal | 313/37 |
| 3,769,600 | 10/1973 | Denholm et al. | 313/63 |
| 3,827,958 | 8/1974 | McGinniss | 204/159.23 |
| 3,846,368 | 11/1974 | Pettit | 428/402 |
| 3,853,727 | 12/1974 | Wrzesinski | 204/159.18 |
| 4,020,256 | 4/1977 | Zweigle et al. | 526/88 |
| 4,027,066 | 5/1977 | Victorius | 428/402 |
| 4,056,653 | 11/1977 | Gebhard et al. | 428/402 |
| 4,071,653 | 1/1978 | Boessler et al. | 428/402 |

FOREIGN PATENT DOCUMENTS 388309  2/1933  United Kingdom .

OTHER PUBLICATIONS

Modern Plastics, Jan. 1979, pp. 72–74, "New Electron Systems Do More Jobs Faster, and With Big Energy Savings".

*Primary Examiner*—Harry Wong, Jr.

[57] ABSTRACT

Apparatus for producing polymers in powdered form is disclosed, including means for forming a finely divided solvent-free spray of a liquid monomer of the polymer which is to be produced, or of a reactive unsaturated polymer. The spray passes through a high energy electron beam in an inert atmosphere in order to polymerize the monomer or reactive unsaturated polymer of the spray while in the spray form and produce a powdered polymer product. The preferred apparatus develops a charge on the particles of the finely divided spray and passes the charged spray through a similarly charged yoke to ensure particle separation and to compress the pattern of the spray prior to passage through the electron beam, which is preferably in the form of a curtain. In a preferred embodiment, a polymerized powdered paint is produced by this apparatus, and the liquid monomer and/or reactive unsaturated polymer may be compounded with color, initiators, pigments or other materials prior to polymerization of a finely divided spray of that liquid.

3 Claims, 3 Drawing Figures

POWDERED POLYMER COMPOSITIONS PRODUCED BY ELECTRON BEAM POLYMERIZATION OF POLYMERIZABLE COMPOSITIONS

CROSS-REFERENCE TO RELATED APPLICATION

This is a continuation-in-part of copending application Ser. No. 938,891 filed Sept 1, 1978, now United States Letters Pat. No. 4,172,776, granted Oct. 30, 1979 originally entitled "METHOD FOR ATOMIZED ELECTRON BEAM POLYMERIZATION OF POLYMERIZABLE MATERIALS" which in turn is a continuation-in-part of copending application Ser. No. 699,864 filed June 25, 1976, entitled "ELECTRON BEAM POLYMERIZATION OF ATOMIZED MONOMERS," now abandoned.

BACKGROUND OF THE INVENTION

Powdered polymer products are presently produced by various complex and expensive procedures. These generally require an initial monomer polymerization in a reaction vessel, in a suitable vehicle. After evaporation of the vehicle to produce a solid polymer, the polymer is generally then compounded in various mixing apparatus, subsequently cooled, and then ground to a powdered product of a desired particle size. Such procedures are obviously quite complex and expensive, and methods for short-cutting this procedure have been sought for a considerable period of time.

In addition, various methods have been utilized to polymerize coatings of various polymerizable organic compounds utilizing irradiation with high energy electrons to effect such polymerization. Thus, Turner U.S. Pat. No. 3,440,084 discloses a process for coating electrically conductive objects employing a gaseous coating material, and simultaneously curing that coating employing radiation-curable coating compositions, such as paints, varnishes, and the like. In that patent, the vaporized organic coating acquires a negative electrical charge upon entering an electron beam, and then is electrostatically deposited upon the work piece constituting a positive electrode. Electrons of polymerization-effecting energy are then directed on the workpiece and the coating is cured thereby.

Waddington U.S. Pat. No. 3,013,957 discloses the exposure of a polymerizable material to high energy radiation in the presence of a blowing agent to decompose the blowing agent. In this process, however, the invention is not directed to polymerization using high energy radiation, but there is a disclosure to the effect that the process of that invention enables desired effects to be achieved with materials which polymerize when irradiated.

Wright U.S. Pat. No. 3,635,750 relates to preparing polymer coatings on a substrate by simultaneous ultraviolet surface photopolymerization. In addition, Schmitz et al U.S. Pat. No. 2,921,006 teaches polymerization of certain monomers by irradiating with high energy electrons, i.e., in the form of a solution or emulsion.

Furthermore, Dewey et al U.S. Pat. No. 2,892,946 teaches the bombardment of gas phase systems with high energy charged particles, which are deflected with a magnetic field in order to cause chemical reactions therein for various purposes.

Finally, various apparatus has been developed for generating an electron beam curtain for a number of purposes. Thus, Sims U.S. Pat. No. 3,612,941 and Denholm, et al U.S. Pat. No. 3,769,600, both assigned to Energy Sciences, Inc. of Bedford, Massachusetts, relate to such apparatus. These patents teach that such energetic electron beam curtains may be used for processing materials such as the curing of metal coatings, cross-linking of plastics, the sterilization of materials, etc.

Each of the above-noted techniques and apparatus for obtaining polymerization in various systems has met with varying degrees of success, but the search has continued for a simple and efficient system whereby polymerized powdered products may be produced.

SUMMARY OF THE INVENTION

In accordance with the present invention, it has now been discovered that polymer compositions in powdered form can be efficiently produced in apparatus in which there are provided an enclosure having a reaction chamber and means for forming within that chamber a controlled finely divided spray of a polymerizable compound selected from the group consisting of monomers and reactive unsaturated polymers, which spray is substantially free from any solvent for the polymerizable compound. The apparatus includes means for generating a beam of high energy electrons and the finely divided spray is passed through the beam to polymerize the polymerizable compound of the finely divided spray in less than about 1 second into a powdered polymer product having a particle size of up to about 10 mils. The apparatus also includes means to provide an inert atmosphere within the chamber and employs monomers and/or reactive unsaturated polymers which are capable of polymerization through free radical initiation, and the finely divided spray is directly converted into a useable powdered polymer product.

In the preferred apparatus, there are means for applying a charge to the particles of the spray and a ground plate at the other end of the path which is of opposite charge; most desirably, the charge upon the particles should be positive. In addition, a yoke having a like charge is desirably provided to control the spray pattern before the spray enters the electron beam.

In a preferred embodiment of the present invention, a polymerized powdered polymer product composition is produced by employing such liquid monomer and/or reactive unsaturated polymer which is in a previously compounded form, i.e., compounded with other necessary ingredients to produce such a powdered paint product, and then passing a finely divided spray of that compounded monomer and/or reactive unsaturated polymer through a beam of electrons, preferably in the form of an electron beam curtain.

In another embodiment of the present invention, and particularly when a polymerized powdered paint product is desired, it is preferred to employ a combination of liquid monomer and liquid reactive unsaturated polymer for producing a finely divided spray, which is again polymerized by passing the same through the beam of electrons. It has thus been found that such combinations provide products which are highly suitable for certain specific applications, and which have properties with regard to viscosity and other essential characteristics that are extremely beneficial to paint products.

Furthermore, particularly in the preferred embodiment of the present invention wherein a powdered paint or pigmented product is produced, the liquid monomer and/or reactive unsaturated polymer is previously compounded prior to atomization and polymerization through the electron beam curtain. Compounding thus includes incorporation of various ingredients desired for use in the end product, such as colors, pigments, initiators, surfactants, fillers, flatting agents, flame retardants, lubricants, etc. In this manner, when the finely divided spray is passed through the electron beam curtain and polymerization occurs, the final powdered product, such as paint, is instantaneously produced upon polymerization, and no further compounding or other steps are required in connection therewith.

It is particularly preferred that the finely divided spray of liquid monomer and/or reactive unsaturated polymer be in an atomized form so that the individual particles may be subjected to the electrons in an electron beam curtain in a most efficient manner, and that the powdered polymer product, such as paint, produced therein, will be in a form for easy collection and use.

BRIEF DESCRIPTION OF THE DRAWINGS

The present invention may be more clearly understood by reference to the accompanying drawings, wherein FIG. 1 is a cross-sectional side view of an apparatus for carrying out the method of the present invention, including an electron beam curtain therein;

FIG. 2 is an elevational perspective view of a similar apparatus for carrying out the method of the present invention; and FIG. 3 is a diagrammatic perspective view of a preferred embodiment of the apparatus.

DETAILED DESCRIPTION

The present invention principally utilizes a source of electrons in order to effect polymerization. In accordance with this invention, it is therefore necessary that the materials which are to be polymerized be capable of polymerization through free radical initiation. It is therefore possible to use a large number of polymerizable compounds in connection with the present invention, although certain varieties of these compounds are particularly preferred, particularly in certain applications thereof. Broadly speaking, however, the finely divided or atomized spray is composed primarily of a polymerizable compound such as a liquid monomer and/or a reactive unsaturated polymer, and again primarily one which is capable of polymerization by free radical initiation.

Among the liquid monomers which may be employed in this regard are included the vinylidene monomers including monovinylidene aromatic hydrocarbons such as styrene and alpha-methylstyrene; ethylenically unsaturated nitriles, such as acrylonitrile, methacrylonitrile, ethacrylonitrile and mixtures thereof; conjugated 1,3-dienes, e.g., butadiene, isoprene, etc.; alpha- or beta-unsaturated monobasic acids and derivatives thereof, e.g. acrylic acid, methyl acrylate, ethyl acrylate, and butyl acrylate, 2-ethylhexyl acrylate, methacrylic acid and the corresponding esters thereof; acrylamide, methacrylamide; vinyl esters such as vinyl acetate, vinyl propionate, etc.; dialkyl maleates or fumarates such as dimethyl maleate, diethyl maleate, dibutyl maleate, the corresponding fumarates; vinylidene halides such as vinylidene chloride, etc.

On the other hand, there are a number of reactive unsaturated liquid polymers which can also be employed as the polymerizable compound of the atomized or finely divided spray of the present invention. Again, these compounds must also be subject to further polymerization or cross-linking by the free radical route, and they may include oligomers. Exemplary are urethane and epoxy formulations having functional groups susceptible to free radical polymerization, polyesters, and various fluorcarbons, all of which are unsaturated to facilitate conversion from a liquid to a solid polymer by free radical action. Thus, the particular compounds within these groups which will provide the reactive unsaturated polymers for use in this invention will include acrylated epoxy compounds, such as the specific acrylated epoxy compounds sold by Dow Chemical Corporation under the designations XD8000.1, XD7530.03, XD7531.01, and that sold by Shell Oil Corporation under the designation DRH303; acrylated oligomers, such as the products sold by Union Carbide Corporation under the designation ACROMER X80; and fluorocarbons such as Fluoropolymer W sold under that designation by Dow Chemical Corporation.

As noted above, in a preferred embodiment of the present invention, a combination of a liquid monomer and a reactive unsaturated liquid polymer is employed. This is primarily done to decrease the viscosity of many of the useful reactive unsaturated polymers mentioned above. It is therefore preferred to employ a low viscosity monomer, preferably one with vinyl functionality, in such a combination.

In any case, prior to producing the finely divided spray of the present invention from the above-noted monomers and/or reactive unsaturated polymers, in many cases it is preferred to previously compound the monomer and/or reactive unsaturated polymer. Thus, after polymerization, the final product which is desired will have been instantaneously produced. The compounding materials are, of course, many, so long as they do not interfere with the free radical polymerization by the electron beam curtain of this invention. These compounds will thus include various pigments, fillers, lubricants, flame retardants, flatting agents, surfactants, initiators, and the like. Primarily in connection with the production of polymerized powdered paint, a number of surfactants could be employed, including non-ionic, anionic or cationic surfactants, such as alkylaryl sulfonates and the like. The variety of different surfactants, and indeed other compounding substances which can be used, will be apparent to those skilled in this art. For example, as a typical flame retardant, a vinyl phosphate such as a product sold by Stauffer Chemical Company under the tradename Fyrol 76 can be employed. As a pigment, various metallic oxides can be employed to produce various colors in the polymerized product. Furthermore, fillers such as titanium dioxide, carbon black, various carbonates or silicates, and the like, can also be employed.

The use of a source of high energy electrons for polymerization in accordance with the present invention is, of course, critical. In particular, in connection with the various monomers discussed above, the energy generally required to accomplish complete polymerization will vary within a very broad range, depending upon the particular application involved, and the specific monomer and/or reactive unsaturated polymer employed, and the production rate desired. In general, however, the energy levels will preferably be less than about 5 calories per gram of monomer and/or reactive unsaturated polymer to be polymerized, and preferably will range about 2 to 5 calories per gram. These energy levels are accomplished by applying a potential to the electron source, such as an electron emitting diode, and generally this potential is about 100,000-300,000 electron volts.

These results can most efficiently be achieved by utilizing an apparatus such as that sold by Energy Sciences, Inc. of Bedford, Massachusetts, under the trademark "Electro-curtain." This device, as diagrammatically shown in the drawings, is described in detail in U.S. Pat. No. 3,612,941, which disclosure is incorporated herein by reference thereto. Other manufactures of such equipment are High Voltage Engineering Co. of Burlington, Massachusetts; Radiation Dynamics, Inc. of Westbury, New York; Texas Nuclear Division of G. D. Searle, of Austin, Texas; and Tube Investments Limited of London, England.

As for the production of an atomized spray of the monomer and/or reactive unsaturated polymer composition to be employed, this can be accomplished using various commercial airless spray equipment now on the market. In particular, such equipment is currently being manufactured by Ransburg Electro-coating Corporation of Indianpolis, Indiana; Binks Manufacturing Company of Chicago, Illinois; DeVilbiss Company of Toledo, Ohio; and Stewart-Warner Corporation of Chicago, Illinois.

In the peferred spray apparatus, the polymerizable composition is provided with a charge and the spray is directed towards a ground plate. The amount of the charge is not critical, but it should be sufficient to facilitate directionalization of the spray, as is customary in electrostatic spray guns. The charge will normally be provided by an electrode at 40,000-90,000 volts potential, and the ground plate cooperating therewith may be at only several volts potential. Generally, the spray gun will be at positive potential and accordingly the ground plate will be at negative potential.

In recent tests of apparatus embodying the invention, it has been found that a negatively charged spray reduces the efficiency of operation because the negatively charged electrons in the electron beam curtain tend to be deflected. Accordingly, the apparatus is preferably one in which a positive charge is aplied to the atomized spray as it leaves the spray gun by 50 to 90 KV positive corona transfer. The positively charged particles will thus tend to attract the electrons, to initiate the free radical polymerization and thereby reduce the megarad dosage required. Far greater latitude is possible regarding monomer selection since free radical polymerization proceeds instantaneously upon impact of a high energy electron (emitting from the electrocurtain) upon a positive pair of cations sharing an electron. The high energy electron acts as a billiard shot to dislodge the shared electron so that the polymerization can proceed instantaneously through the positive ion. By developing a positive charge upon the sprayed atomized particles, the initiation of polymerization is started in the corona immediately adjacent the spray gun. The positive particle also adds considerable impact force to the electron beam action since it is of opposite charge. Reaction time is greatly reduced and difficult to handle monomers which would normally require over two megarads of dosage under neutral conditions can be utilized at one megarad dosage.

Since it is desirable to prevent the spray from becoming too disperse, it is desirable to pass it through a yoke which bears the same charge as the spray particles to compress or alter the cross section of the spray. For example, a conical or cylindrical yoke will generally serve to confine the circular cross section of the spray pattern issuing from the gun. A complex configuration changing from circular cross section to a rectangular cross section can be used to produce a flattened spray pattern since the charged spray particles are repelled by the like charge of the yoke. Generally, this yoke will be at a high potential approximating that of the electrostatic spray gun, and preferably the deflection plates will be positively charged for the reasons set forth above.

The spray chamber is filled with an inert atmosphere such as nitrogen or helium and is sparged with the inert gas prior to spraying the polymerizable composition thereinto. This can be conveniently accomplished by use of the inert gas as the propellant for the polymerizable composition in the spray apparatus.

Use of the method of the present invention is highly advantageous in that spherical particles of relatively uniform size may be produced, with all of the attendant advantages. In this regard, the use of electrostatic spray guns provides a charge on the spherical droplets to preclude their coalescing into larger droplets.

The polymerizable composition as supplied to the spray equipment is essentially free from solvent so as to eliminate solvent vapors with the polymerization chamber. Accordingly, the polymerizable composition as formulated should have a viscosity permitting its transport to and through the spray equipment, which will generally require a viscosity of not more than about 1200 centipoises, and preferably less than b 900 centipoises. As herein indicated, the viscosity is readily varied by the amount and nature of liquid monomer or partially polymerized polymer if the formulation.

If so desire, the apparatus may include two spaced electron beams along the path of the sprayed formulation. In this fashion, total polymerization can be ensured and higher radiation levels of 2 or more megarads may be attained. This may be conveniently effected by providing two parallel electron beam curtains spaced 10-20 inches on center along the path of travel of the sprayed formulation.

Figure 2:
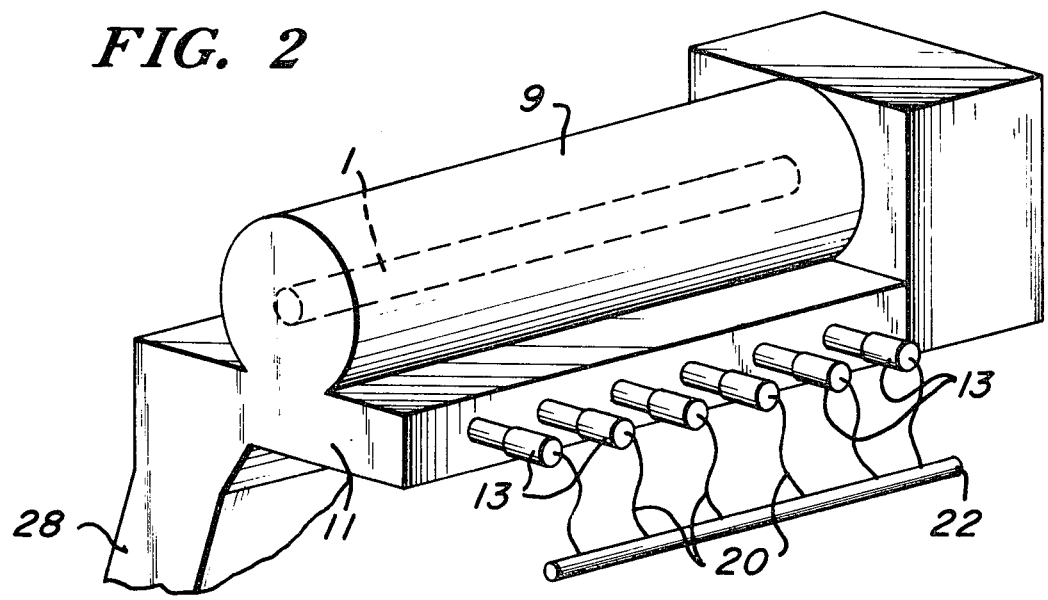

To more fully understand this system, with respect to the presently claimed process, reference is made to the drawings herein, wherein like numerals refer to like portions thereof. As shown in FIG. 1, an electron gun 1 is employed as a source of electrons. As discussed in U.S. Pat. No. 3,769,600, a longitudinally extending filament is disposed within a channel provided with a control grid extending longitudinally parallel to and coextensively with the cathode or electron gun 1. Coaxially surrounding the cathode or electron gun 1 and control grid is an electrostatic shield or Faraday cage 3 so that a beam of electrons is formed into an extended-dimension energetic electron curtain 15 that may expand as it exits window 5 therein. As the electrons pass through the vacuum maintained within the shield 3, they may then exit through window 7 in the overall head shield 9 of the apparatus. As shown in FIG. 2, the system is arranged such that this electron beam curtain 15 passes through the polymerization zone 11. The atomizers thus produce and project a finely divided atomized spray of polymerizable composition into the polymerization zone 11, generally perpendicularly to the electron beam curtain 15. The polymerizable composition is fed into the atomizers 13 through line 20, from a source of monomer or polymerizable compound from supply manifold 22. In particular, it is highly preferred to employ airless spray equipment in order to eliminate the injection of a secondary stream of air into the polymerization zone, and/or to use an inert gas as the propellant or entraining medium. Such equipment is discussed above.

As the individual particles of polymerizable composition containing monomer and/or reactive unsaturated polymer, pass through the above-described electron beam curtain, polymerization takes place substantially instantaneously and powdered polymer composition particles 24 emerge from the electron beam curtain. These particles may then be easily collected in chute 26. The powdered polymer composition particles may then be handled in any conventional manner, such as bagging, or otherwise prepared for usage or shipment. In addition, the powdered product may fall onto a conveyor 28, and be handled in that manner.

Figure 3:
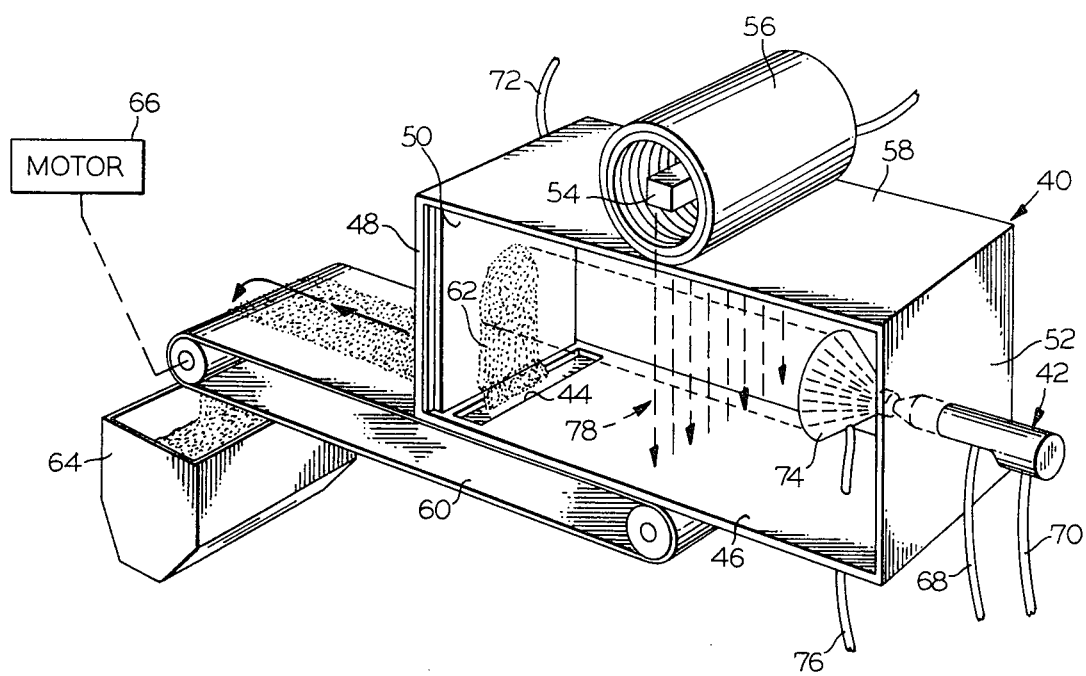

In FIG. 3, there is diagrammatically illustrated a highly desirable form of apparatus for practice of the method of the present invention. The enclosure generally designated by the numeral 40 is dimensioned for use with one spray gun generally designated by the numeral 42, and may be elongated for use with a multiplicity of guns 42. The walls of the enclosure 40 are lead lined (¼" thickness) to absorb electrons which do not interact with the spray, and a discharge opening 44 is provided in the bottom wall 46 adjacent the end wall 48 which in turn has mounted thereon the ground plate 50. As seen, the spray gun 42 is mounted in the opposite end wall 52, and the electron beam curtain generating device 54 is mounted in the head shield 56 on the top wall 58.

A conveyor 60 extends beneath the bottom wall 46, under its opening 44 and beyond the end wall 48, so that it collects polymer particles 62 falling from the ground plate 50, and transports them to the hopper 64. The conveyor belt 60 is powered by motor 66.

A potential is applied to the spray gun 42 by current supplied through the cable 68 so that the spray particles issuing therefrom carry a charge. The polymerizable composition is supplied to the gun 42 in a medium of inert gas through the conduit 70. Potential is applied to the ground plate 50 through the cable 72 and to the funnel-shaped yoke 74 through the cable 76.

As will be readily appreciated, the spray particles of polymerizable composition exiting the spray gun 42 carry a charge and pass through the yoke 74 which carries a like charge. As a result, the spray pattern is generally compressed before the spray particles enter the electron beam curtain 78. As the particles pass through the electron beam curtain 78, the electrons strike the particles to produce free radicals and resultant polymerization of the polymerizable composition. The polymerized and now solid particles strike the oppositely charged ground plate 50 and then fall through the opening 44 onto the conveyor 60 which discharges them into the hopper 64.

As for the polymerization, it occurs in the electron beam curtain in two stages although some polymerization may begin adjacent the gun when a positive charge is applied to the spray particles. Initiation occurs first whereby free radicals are created, and this occurs in a few milliseconds. Secondly, the propagation of polymerization is finalized within less than one second, and because of the short time periods involved for polymerization, it is possible to accomplish this result in an inert atmosphere in the form of a vaporized mist. The collected powder product is thus relatively cool, block resistant and fully polymerized after passing outwardly from the electron beam curtain. Since the electron beam itself can initiate free radical polymerization in spray particles or droplets of up to 10 mils in diameter, the particle size of the collected powder can be controlled through proper atomization from 1 to 10 mils in diameter.

As a typical example of a powdered product which can be prepared in accordance with the method of the present invention, the following formulation can be utilized to prepare such a product.

| Component | Parts By Weight |
|---|---|
| An acrylated epoxy compound marketed by Shell Oil Corporation under the designation DRH303 | 100 |
| Pentaerythritol triacrylate | 20 |
| N-vinyl-2-pyrrolidone | 5 |
| 2-ethyl hexyl acrylate | 10 |
| 2-Titanium dioxide | 25 |
| Iron oxide | 5 |

By preparing an atomized spray of this compounded composition and passing same through an electron beam produced by a potential of between 100,000 and 300,000 electron volts, it is possible to produce a fully polymerized powdered paint product in a direct and instantaneous manner. The powdered product can be utilized in virtuially all markets with the existing equipment now used for such products.

It is also possible, however, to employ the method of the present invention in connection with various other end uses in addition to various paint applications, such as automotive paint, etc. These other uses include coil coatings, sintering powders for textiles and non-wovens, can coatings, and sealants, plastic finishes, molding powders, electrical encapsulation for semiconductors, coating powders for appliances and furniture, powders of finely dispersed pigment concentrates with universal solubility (e.g., phthalocyanine blue in isobornyl acrylate).

Ilustrative of the efficacy of the method of the present invention are the following specific examples, wherein all amounts are parts by weight unless otherwise indicated.

EXAMPLE ONE

In this experiment, apparatus constructed substantially in accordance with FIG. 3 of the attached drawings was employed, except that the apparatus did not include a discharge opening and conveyor and did not include a charged yoke to control the spray pattern. The spray gun was a DeVilbiss electrostatic spray gun Model AGC to which a potential of 30,000 volts (negative) was applied at the nozzle electrode. The test was conducted at the facility of Energy Sciences, Inc. in Bedford, Massachusetts using their pilot model electron beam curtain device. The terminal voltage was set at 160,000 electron volts. The velocity of the sprayed particles of the polymerizable composition was estimated at 700 feet per minute; accordingly, it was estimated that the dosage was approximately 0.9 megarads.

The polymerizable formulation used in the test was as follows:

| Compound | Parts |
|---|---|
| Epoxydized acrylate sold by Shell Chemical under the trademark DRH303 | 100 |
| Pentaerythritol triacrylate | 20 |

-continued

| Compound | Parts |
| --- | --- |
| N-vinyl-2-pyrrolidone | 5 |
| 2-ethylhexylacrylate | 10 |
| Titanium dioxide | 25 |
| Iron oxide | 5 |

At the beginning of operation, the polymerization chamber was sparged of air by introduction of nitrogen at 80 psi through the spray gun. After the chamber was sparged, the nitrogen was passed through a reservoir of the polymerizable formulation to entrain it and propel it through the gun and through the polymerization chamber. The ground plate was operated at about 3 volts (positive).

Using this apparatus and composition, approximately 20 grams of polymer composition powder was produced and evaluated. It was found that the particles were spherical and substantially uniform in size within the range of 20–30 microns diameter and that the material was completely polymerized. Some of the powder so produced was used to coat aluminum panels and exhibited excellent bonding characteristics.

EXAMPLE TWO

To evaluate the feasibility of using the electron beam curtain for polymerization of other formulations under similar conditions, a series of polymerizable composition were prepared as indicated below:

| Formula | A | B | C |
| --- | --- | --- | --- |
| Vinyl ester prepolymer sold by Dow Chemical under the trademark XD 9016 | — | 100 | — |
| Epoxydized arcylate sold by Shell Chemical under the trademark DRH303 | 100 | — | 100 |
| Pentaerythritol triacrylate | 20 | — | — |
| Hexanediol diacrylate | — | 20 | — |
| N-vinyl-2-pyrrolidone | 5 | 5 | 10 |
| 2-Ethylhexylacrylate | 10 | 20 | — |
| Acrylic acid | — | — | 10 |
| Titanium dioxide | 25 | — | — |
| Iron oxide | 5 | — | — |

Each composition was coated upon three different panels: aluminum, ABS plastic sheeting, and release paper. The several panels were placed in the electron beam curtain to determine the effect of varying the megarad dosage. In all instances, the polymer coatings were completely cured at dosages of less than 0.8 megarads.

Further modifications will also occur to those skilled in this art, and all such are considered to fall within the spirit and scope of this invention as defined in the appended claims hereto.

I claim:

1. A powdered polymer product composition consisting essentially of a polymer and at least one dispersed component therein selected from the group consisting of pigments, fillers, and the combination thereof, said polymer product composition comprising substantially spherical particles of a relatively uniform particles size of up to about 10 mils, said particles being formed from a liquid polymerizable composition including
   (a) a liquid polymerizable compound selected from the group consisting of monomers, reactive unsaturated polymers, and mixtures thereof, capable of free radical polymerization, and
   (b) at least one component dispersed therein selected from the group consisting of pigments, fillers, and the combination thereof,
said product having been produced by polymerizing said liquid polymerizable composition by a method in which
   (a) said liquid composition is formed into a finely divided atomized spray in an inert atmosphere, said composition and spray being substantially free from solvent for said polymerizable compound, and
   (b) said spray is passed through a beam of high energy electrons to polymerize substantially completely the polymerizable compound of said finely divided atomized spray of said liquid polymerizable composition while said composition is in the form of said atomized spray and in less than about one second into said powdered polymer product composition.

2. The polymer product of claim 1 comprising a pigment dispersion which is produced
   (a) from a polymerizable composition compounded from a liquid polymerizable compound a pigment and other optional components, said pigment and optional components being substantially uniformly dispersed throughout said spherical particles of polymer product composition.

3. The polymer product in accordance with claim 1 wherein said spherical particles are of substantially uniform particle size.

* * * * *